United States Patent
Chung et al.

(10) Patent No.: US 9,967,411 B2
(45) Date of Patent: May 8, 2018

(54) IMAGE FORMING APPARATUS AND METHOD FOR REVISING COLOR

(71) Applicant: S-PRINTING SOLUTION CO., LTD., Suwon-si (KR)

(72) Inventors: Woo-jun Chung, Suwon-si (KR); Hyun-soo Oh, Suwon-si (KR); In-ho Park, Suwon-si (KR); Nam-ju Shin, Suwon-si (KR); Kyeong-man Kim, Yongin-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days. days.

(21) Appl. No.: 14/850,151

(22) Filed: Sep. 10, 2015

(65) Prior Publication Data
US 2016/0191750 A1    Jun. 30, 2016

(30) Foreign Application Priority Data

Dec. 26, 2014    (KR) .......................... 10-2014-0190634

(51) Int. Cl.
*H04N 1/60* (2006.01)
*H04N 1/00* (2006.01)
*G03G 15/00* (2006.01)

(52) U.S. Cl.
CPC ..... *H04N 1/00307* (2013.01); *G03G 15/5054* (2013.01); *G03G 15/5062* (2013.01); *G03G 15/5075* (2013.01); *H04N 1/6027* (2013.01); *H04N 1/6033* (2013.01); *H04N 1/6036* (2013.01); *G03G 2215/00569* (2013.01); *H04N 2201/0094* (2013.01)

(58) Field of Classification Search
None
See application file for complete search history.

(56) References Cited

U.S. PATENT DOCUMENTS 5,661,575 A * 8/1997 Yamashita ............... H04N 9/69
                                                    348/674
8,514,448 B2 * 8/2013 Park ..................... H04N 1/4072
                                                    358/1.9

(Continued)

FOREIGN PATENT DOCUMENTS

EP          2538656          12/2012

OTHER PUBLICATIONS

European Office Action dated May 2, 2016 in European Patent Application No. 15187987.1.

(Continued)

*Primary Examiner* — Paul F Payer
(74) *Attorney, Agent, or Firm* — Staas & Halsey LLP

(57) ABSTRACT

An image forming apparatus is provided. The image forming apparatus includes: a storage configured to store a color conversion table; an image former configured to print a compensation chart corresponding to the color conversion table; a scanner configured to scan the printed compensation chart; and a changer configured to understand a range of brightness that the image former is able to represent using the scanned compensation chart, generate a gamma curve corresponding to the understood range of brightness, and change the color conversion table based on the generated gamma curve.

24 Claims, 16 Drawing Sheets
(2 of 16 Drawing Sheet(s) Filed in Color)

(56) References Cited

U.S. PATENT DOCUMENTS

| 8,542,419 B2 * | 9/2013 | Matsuoka | H04N 1/46 |
| | | | 358/1.9 |
| 2003/0058471 A1 * | 3/2003 | Okubo | H04N 1/00 |
| | | | 358/1.16 |
| 2006/0158670 A1 * | 7/2006 | Park | H04N 1/6011 |
| | | | 358/1.9 |
| 2009/0268961 A1 * | 10/2009 | Lu | H04N 9/68 |
| | | | 382/167 |
| 2011/0063697 A1 | 3/2011 | Shibuya | |
| 2012/0320394 A1 * | 12/2012 | Park | H04N 1/6033 |
| | | | 358/1.9 |

OTHER PUBLICATIONS

Examination Report dated Aug. 17, 2017 in related European Patent Application No. 15187987.1.

* cited by examiner

IMAGE FORMING APPARATUS AND METHOD FOR REVISING COLOR

CROSS-REFERENCE TO RELATED APPLICATIONS

This application claims the priority benefit under 35 U.S.C. § 119(a) of a Korean patent application filed on Dec. 26, 2014 in the Korean Intellectual Property Office and assigned Serial No. 10-2014-0190634, the entire disclosure of which is hereby incorporated by reference.

BACKGROUND

1. Field

Apparatuses and methods consistent with exemplary embodiments relate to an image forming apparatus and a method for revising colors, and more particularly, to an image forming apparatus which is capable of revising colors to have output characteristics desired by a user within a range of brightness that the image forming apparatus can currently represent, and a method for revising colors.

2. Description of the Related Art

In general, an image forming apparatus refers to an apparatus which prints printing data generated in a printing control terminal device such as a computer on recording paper. Examples of such an image forming apparatus include a copier, a printer, a facsimile machine, or a Multi Function Peripheral (MFP) which complexly the functions of the above-mentioned devices through a single device.

To maintain an initial output characteristic, a related-art method corrects an engine control factor using a color brightness sensor installed in an engine unit, or performs gamma or half-tone correction using a color compensation chart.

However, the related-art method corrects color brightness characteristic without considering a current device level of the image forming apparatus. That is, since color brightness areas that the image forming apparatus cannot represent due to long use are not considered, a color deviation may be caused by a change in hardware, that is, a color deviation may be caused as the image forming apparatus is used for a long time.

In addition, the related-art method is capable of correcting the overall color brightness characteristics of the image forming apparatus, but has a limit to maintaining a gray balance or a color balance.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide an image forming apparatus which is capable of revising colors to have an output characteristic desired by a user within a range of brightness that the image forming apparatus can currently represent, and a method for revising colors.

According to an aspect of one or more exemplary embodiments, there is provided an image forming apparatus including: a storage to store a color conversion table; an image former to print a compensation chart corresponding to the color conversion table; a scanner to scan the printed compensation chart; and a changer to recognize a range of brightness that the image former is able to provide to an image to be printed using the scanned compensation chart, generate a gamma curve corresponding to the recognized range of brightness, and change the color conversion table based on the generated gamma curve.

The compensation chart may include a gradation area in which color values of different color brightness ranges are arranged serially.

The compensation chart may include a plurality of gradation areas which are arranged at a distance from one another.

The gradation area may include: a cyan area in which cyan colors of different color brightness ranges are arranged serially; a magenta area in which magenta colors of different color brightness ranges are arranged serially; a yellow area in which yellow colors of different color brightness ranges are arranged serially; and a black area in which black colors of different color brightness ranges using a black toner are arranged serially.

The gradation area may further include a composite black area in which black colors of different color brightness ranges using CMY toners are arranged serially.

The compensation chart may further include another area having a plurality of black colors displayed at four corners of the gradation area apart from one another.

The changer may convert RGB color values of the scanned compensation chart into a YCC color space, and may recognize the range of brightness that the image former is able to provide to the image to be printed.

The changer may convert RGB color values of the scanned compensation chart into a HSV color space, convert only a hue value of the HSV color space into an RGB color space, and convert RGB values of the converted RGB color space into YCC color space.

The changer may generate a gamma curve corresponding to each of the CMYK colors.

The image forming apparatus may further include a manipulation inputter to receive selection of a user favorite color brightness range for each of the CMYK colors, and the changer may change the color conversion table by reflecting the selected user favorite color brightness range.

The image forming apparatus may further include a communication interface configured to receive input of a color revision initiation command from a mobile device, and, in response to the color revision initiation command being inputted, the image former may be configured to print the compensation chart.

According to an aspect of one or more exemplary embodiments, there is provided a color revision method of an image forming apparatus, including: printing a compensation chart corresponding to a pre-stored color conversion table; scanning the printed compensation chart; recognizing a range of brightness that an image former is able to provide to an image to be printed using the scanned compensation chart, and generating a gamma curve corresponding to the recognized range of brightness; and changing the color conversion table based on the generated gamma curve.

The compensation chart may include a gradation area in which color values of different color brightness ranges are arranged serially.

The gradation area may include: a cyan area in which cyan colors of different color brightness ranges are arranged serially; a magenta area in which magenta colors of different color brightness ranges are arranged serially; a yellow area in which yellow colors of different color brightness ranges are arranged serially; a black area in which black colors of different color brightness ranges using a black toner are arranged serially; and a composite black area in which black colors of different color brightness ranges using CMY toners are arranged serially.

The compensation chart may further include another area having a plurality of black colors displayed at four corners of the gradation area apart from one another.

The generating the gamma curve may include: converting RGB color values of the scanned compensation chart into a YCC color space; and recognizing the range of brightness that the image former is able to provide to the image to be printed.

The converting into the YCC color space may include converting RGB color values of the scanned compensation chart into a HSV color space, converting only a hue value of the HSV color space into an RGB color space, and converting RGB values of the converted RGB color space into YCC color space.

The generating the gamma curve may include generating a gamma curve corresponding to each of CMYK colors.

The color revision method may further include receiving selection of a user favorite color brightness range for each of the CMYK colors, wherein the changing the color conversion table may include changing the color conversion table by reflecting the selected user favorite color brightness range.

The color revision method may further include receiving input of a color revision initiation command from a mobile device.

The color version method may further include transmitting the changed color conversion table to a mobile device.

According to an aspect of one or more exemplary embodiments, there is provided a mobile device which may include a display; a manipulation inputter to receive a color revision initiation command from a user; a communication interface configured to wirelessly connect to an image forming apparatus and configured to receive information for displaying a user interface for the user to select a function of the image forming apparatus on the display; a controller configured to control the display based on the received information to display the user interface and configured to control the communication interface to transmit the color revision initiation command to the image forming apparatus to command the image forming apparatus to print a compensation chart corresponding to a color conversion table.

The communication interface may be configured to receive a transmission from the image forming apparatus indicating that the compensation chart has been printed, and the controller may be configured to control the display to display a message informing the user that the compensation chart has been printed in response to the transmission from the image forming apparatus.

The communication interface may be configured to search for a plurality of image forming apparatuses.

The communication interface may be configured to search for a plurality of image forming apparatuses; the display is configured to display a list of the plurality of image forming apparatuses; and the manipulation inputter is configured to receive a selection of one of the image forming apparatuses from the user.

According to an aspect of one or more exemplary embodiments, there is provided at least one non-transitory computer readable medium storing computer readable instructions which when executed implement methods of one or more embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other of embodiments of the present disclosure will be more apparent from the following description taken in conjunction with the accompanying drawings, in which.

DETAILED DESCRIPTION

Figure 1:
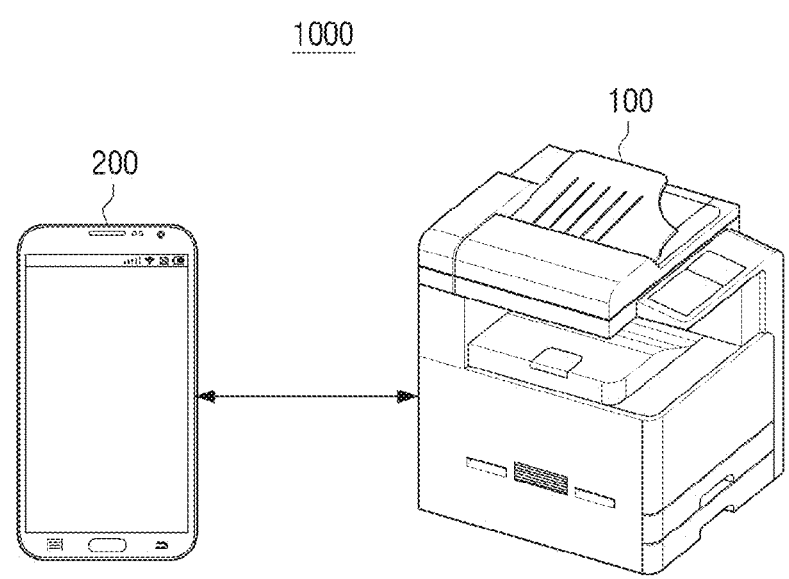
FIG. 1 is a view showing an image forming apparatus according to an exemplary embodiment.

Exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

The terms "first", "second", etc. may be used to describe diverse components, but the components are not limited by the terms. The terms are only used to distinguish one component from the others.

The terms used in the present application are only used to describe exemplary embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In exemplary embodiments of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Hereinafter, the present disclosure will be described in detail with reference to the accompanying drawings.

FIG. 1 is a view showing an image forming system according to an exemplary embodiment.

Referring to FIG. 1, the image forming system 1000 may include an image forming apparatus 100 and a mobile device 200.

The image forming apparatus 100 may print a document or scan a manuscript. In addition, in response to a color revision initiation command being inputted, the image forming apparatus 100 may print a compensation chart corresponding to a pre-stored color conversion table, and scan the printed compensation chart. The compensation chart may include a gradation area in which color values of different color brightness ranges are arranged serially.

In addition, the image forming apparatus 100 may change the pre-stored color conversion table using the scanned compensation chart. A detailed configuration and operation of such an image forming apparatus 100 will be explained below with reference to FIG. 2.

The mobile device 200 may display a UI to control the functions of the image forming apparatus 100 and may receive various control commands on the image forming apparatus 100 through the displayed UI. Herein, the control command may include a print command to print data pre-stored in the mobile device 200 in the image forming apparatus 100, a scan command to scan a document laid on an Automatic Document Feeder (ADF) or a flatbed of the image forming apparatus 100, a fax command to fax data pre-stored in the mobile device 200, and a color revision initiation command to change the color conversion table.

In addition, the mobile device 200 may transmit control data or printing data on the image forming apparatus 100, which corresponds to the above-described control command, or may receive scan data which is generated in the image forming apparatus 100. In addition, the mobile device 200 may receive state information of the image forming apparatus 100 or progress information on an ongoing job. A detailed configuration and operation of the mobile device 200 will be explained below with reference to FIG. 10. Herein, the mobile device 200 may be a laptop, a mobile phone, a smartphone, a Portable Multimedia Player (PMP), or an MP3 player.

As described above, the image forming system 1000 according to an exemplary embodiment prints the compensation chart and scans the printed compensation chart, thereby easily revising colors. In addition, since the colors are revised using really printed output, it is possible to detect and correct an error occurring in the overall print operation. In addition, the image forming system 1000 according to an exemplary embodiment understands (recognizes) a range of brightness that the image forming apparatus 100 can currently represent (provide), and thus can minimize a color deviation which is caused by hardware change, that is, a color deviation which is caused as the image forming apparatus is used for a long time.

In addition, a color revision command of the image forming apparatus 100 may be inputted through the mobile device 200, so that a user can easily maintain and manage the image forming apparatus 100.

In FIG. 1, a single mobile device is connected with a single image forming apparatus. However, a single mobile device may be connected with a plurality of image forming apparatuses in practice, and each of the image forming apparatuses may be connected with a plurality of mobile devices.

In addition, in practice, devices may be connected with one another directly or indirectly via a router or another device (for example, a server). In addition, in the illustrated example, the devices are connected with each other via a wire, but in practice, may be connected with each other wirelessly.

In addition, in FIG. 1, the user inputs the color revision initiation command through the mobile device, but in practice, the user may directly input the color revision initiation command on the image forming apparatus.

In addition, in FIG. 1, the image forming apparatus 100 directly scans the compensation chart. However, the image forming apparatus 100 may be a printer which is only able to print and may use the compensation chart which is scanned by an extra image reading apparatus.

Figure 2:
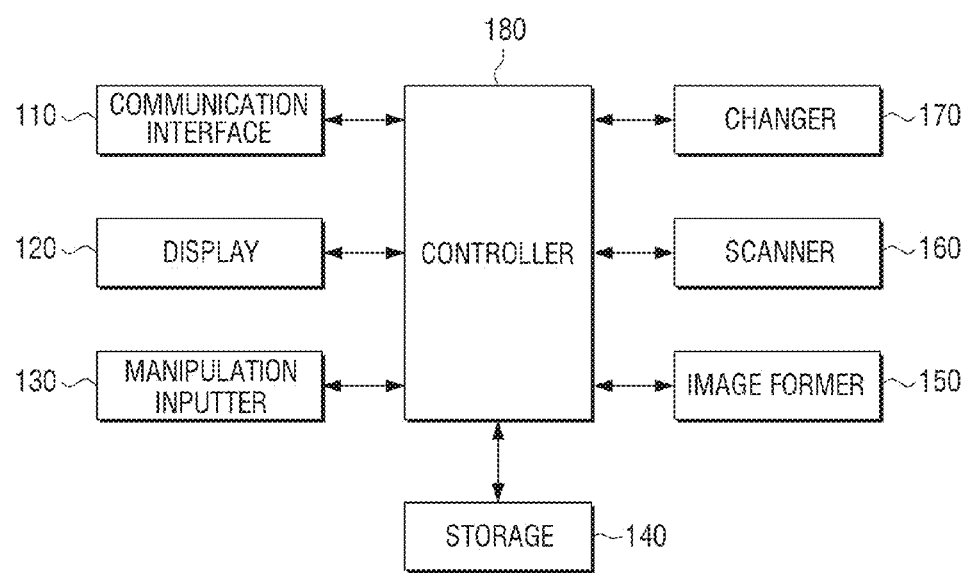
FIG. 2 is a view showing the configuration of the image forming apparatus of FIG. 1.

FIG. 2 is a view showing the configuration of the image forming apparatus of FIG. 1.

Referring to FIG. 2, the image forming apparatus 100 includes a communication interface 110, a display 120, a manipulation inputter 130, a storage 140, an image former 150, a scanner 160, a changer 170, and a controller 180. Herein, the image forming apparatus 100 may be a copier, a printer, a facsimile machine, or a multi-function peripheral (MFP) integrating the functions of the above-mentioned devices in a single device.

The communication interface 110 may be connected with the mobile device 200 or a host device and may receive printing data from the mobile device 200 or the host device. Specifically, the communication interface 110 is configured to connect the image forming apparatus 100 with an external device, and may be configured by a parallel port, a Universal Serial Bus (USB) port, a wireless port, etc.

Figure 4:
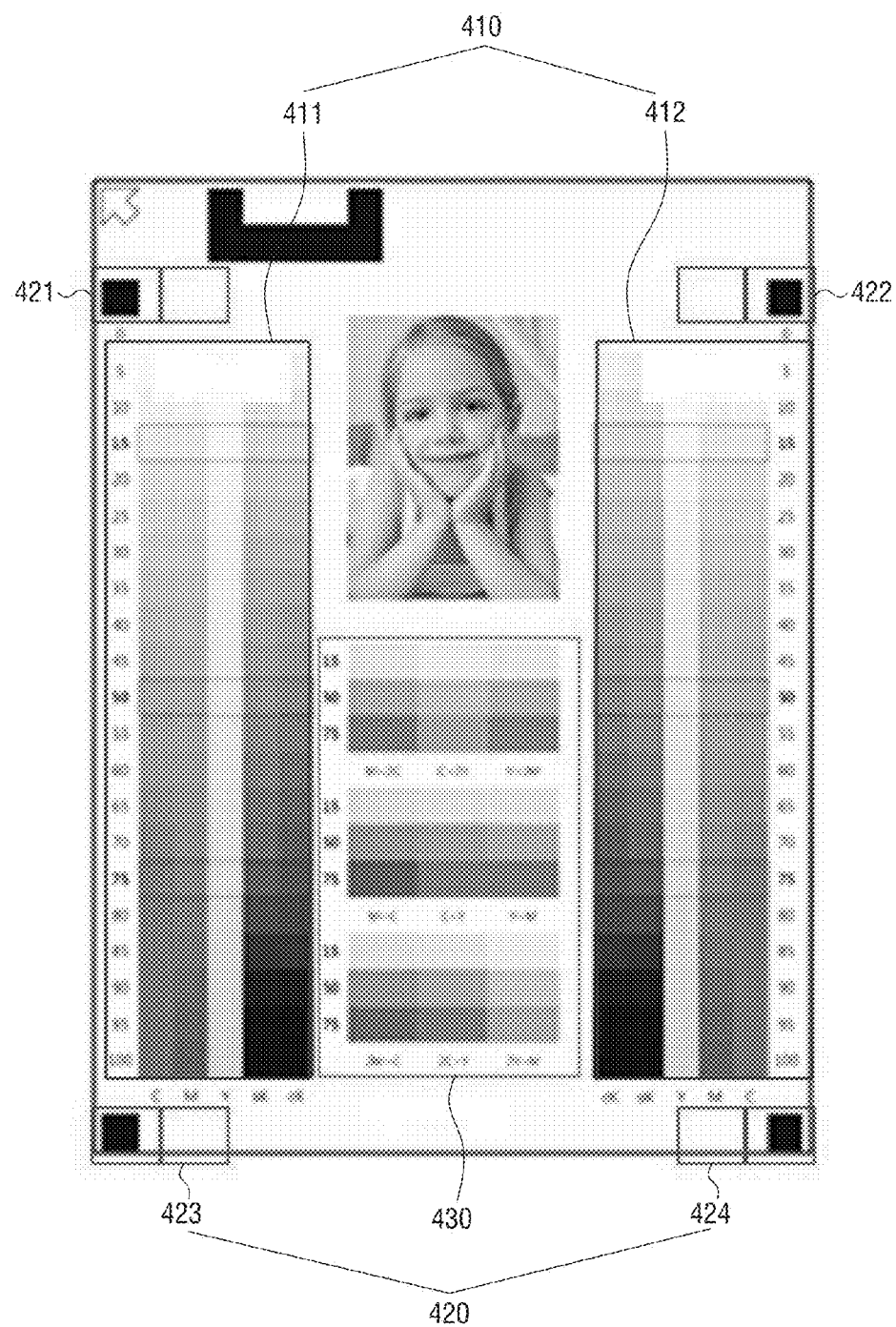
FIG. 4 is a view showing an example of a compensation chart according to an exemplary embodiment.

In addition, the communication interface 110 may receive data which is scanned by an external image reading apparatus (or the mobile device 200) (specifically, a scan image of the compensation chart). The compensation chart refers to a chart including a gradation area of color values of different color brightness ranges. In addition, the compensation chart may include a plurality of gradation areas, and may have color values of different color brightness for each of cyan, magenta, yellow, and black arranged serially. In addition, the compensation chart may further include a second area which includes a plurality of black colors of a predetermined color brightness arranged at four corners of the gradation area apart from one another. An example of such a gradation chart is illustrated in FIG. 4.

In addition, the communication interface 110 may provide information on an operation state of the image forming apparatus 100 to the mobile device 200, or may receive various control commands such as a print command or etc. from the mobile device 200.

The display 120 displays a variety of information provided by the image forming apparatus 100. Specifically, the display 120 may display the operation state of the image forming apparatus 100 or may display a user interface window for the user to select a function or an option. The display 120 may be a monitor such as an LCD, a CRT, or etc., and may be implemented by using a touch screen which performs the function of the manipulation inputter 130, which will be described below, simultaneously.

In addition, the display 120 may display a user interface window to receive input of the color revision initiation command, and may display a user interface window to receive input of a name of a new profile generated by color revision, which will be described later.

In addition, the display 120 may display a user interface window to receive selection of a user's favorite color brightness range for each color of cyan, magenta, yellow, and black (CMYK). Various user interface windows displayable on the display 120 will b explained below with reference to FIGS. 7 to 9.

In addition, the manipulation inputter 130 may be provided with a plurality of function keys through which the user may set or select the various functions supported by the image forming apparatus 100. The manipulation inputter 130 may be implemented by using a device such as a mouse, a keyboard, or etc., and may be implemented by using a touch screen which performs the function of the above-described display 120 simultaneously. Through the manipulation inputter 130, the user may input the various control commands to the image forming apparatus 100. That is, the user may input the color revision initiation command to revise colors of the image forming apparatus 100.

The color revision may be divided into two methods. One is initial output characteristic maintenance color revision to allow the image forming apparatus 100 to maintain an initial output characteristic, and the other is color characteristic change revision to allow the image forming apparatus 100 to have a user's favorite output characteristic. In practice, in response to the user's color revision initiation command, only the initial output characteristic maintenance color revision may be performed, or the color characteristic change revision may be performed serially after the initial output characteristic maintenance color revision. In addition, the color characteristic change revision may be performed only in response to user's separate selection.

In addition, the manipulation inputter 130 may receive input of a name of a new profile generated by the color revision, and may receive selection of a user's favorite color brightness range for each color of the CMYK.

The storage 140 may store printing data. Specifically, the storage 140 may store the printing data which is received from the above-described communication interface 110. The storage 140 may be implemented by using not only a storage medium in the image forming apparatus 100 but also an external storage medium, a removable disk including a USB memory, a web server through a network, etc.

In addition, the storage 140 may store the color conversion table. Specifically, the color conversion table is a lookup table which shows conversion values for converting colors in an RGB color space into colors in a CMYK color space in order to reproduce colors in the RGB color space in the printing data through the image forming apparatus 100 which uses the CMYK color space. In an exemplary embodiment, the color conversion table is only used to convert the RGB color space into the CMYK color space. However, in practice, the color conversion table may be used to convert color spaces other than the RGB color space into the CMYK color space.

In addition, the storage 140 may store a plurality of color conversion tables. Specifically, the storage 140 may store a one-dimensional gamma curve (or a gamma table), a scanning three-dimensional (3D) RGB color table, a printing 3D RGB color table, a panel table, and a screen table. The printing 3D RGB color table corresponds to the above-described color conversion table. In an exemplary embodiment, the color revision is performed for the printing 3D RGB color table, but in practice, the color revision may be applied to the scanning 3D RGB color table, as will be explained.

Herein, the gamma curve (or correction curve) indicates a relation curve of a really outputted gray scale to an inputted color gray scale. The gamma curve may be expressed by a mathematical equation or graph or a table.

In addition, a plurality of printing 3D RGB color tables may be stored in the storage 140. Specifically, not only a basic color conversion table but also a color conversion table reflecting a user's favorite color brightness range may be stored altogether. In this case, the color conversion tables may be stored in different profile names.

In addition, the storage 140 may store an image corresponding to the compensation chart. Specifically, the storage 140 may store a compensation chart image corresponding to the stored color conversion table. The color conversion table may be changed by the changer 170, which will be described later, and, in response to the color conversion table being changed, the image corresponding to the compensation chart may be changed.

In addition, the storage 140 may store a scanned scan image.

The image former 150 may print printing data. Specifically, the image former 150 may print the printing data received through the communication interface 110. The image former 150 may be provided with a plurality of engines. The plurality of engines may be C/M/Y/K engines. The engine recited herein is configured to perform laser scanning/charging/transferring with respect to a single color and form an image corresponding to a specific pattern and color on an intermediate transfer belt or a manuscript. The engine may operate not only in a laser printer method but also in an inkjet method.

The engine for each color may include a color brightness range sensor (Conductivity, Temperature, Depth (CTD) sensor) to correct its own color brightness range, and may initialize by itself using a pre-stored gamma curve.

In addition, the image former 150 may print the compensation chart. Specifically, the image former 150 may initialize the color brightness range for the engine provided therein and print the compensation chart corresponding to the color conversion table pre-stored in the storage 140 using the engine the color brightness range of which is initialized. The compensation chart according to an exemplary embodiment will be explained below with reference to FIG. 4.

The scanner 160 may include a lens for focusing light reflected from the manuscript onto an image sensor provided therein, and read out image information of the manuscript from the light focused onto the image sensor. In addition, the scanner 160 may scan the compensation chart and provide the scanned compensation chart to the changer 170. The scanner 160 may be located on a flatbed or in a Duplex Automatic Document Feeder (DADF).

In an exemplary embodiment, the scanner 160 provided in the image forming apparatus 100 directly scans and uses the compensation chart. However, the compensation chart may be scanned through an external scan device and the compensation chart scanned by the external scan device may be received through the communication interface 110.

The changer 170 may understand (recognize) the range of brightness that the image former 150 can represent using the scanned compensation chart, generate a gamma curve corresponding to the understood (recognized) range of brightness, and change the color conversion table based on the generated gamma curve.

Specifically, the changer 170 may extract color values included in the compensation chart from the compensation chart scanned by the scanner 160, and understand the range of brightness that the image former 150 can represent using the extracted color values. In this case, the changer 170 may not directly extract brightness values from the RGB color values and may change the RGB color values to a YCC (YCbCr) color space and understand the range of brightness that the image former (specifically, the engine for each color (C/M/Y/K engines)) can represent. The operation of the chanter 170 will be explained below with reference to FIG. 6.

In addition, the changer 170 may extract the color values included in the compensation chart from the compensation chart scanned by the scanner 160, and may generate an RGB 3D color matrix of the scanned compensation chart using the extracted color values. Specifically, the changer 170 may generate the RGB 3D color matrix based on the scanned color values using regression technology. The regression technology is a technology for inferring an undefined RGB color space using a plurality of color values, and is well known in the related art and thus is not described in detail.

In addition, the changer 170 may understand the range of brightness that can be represented on the color conversion table using the color conversion table pre-stored in the storage 140.

In addition, the changer 170 may generate an RGB 3D color matrix of the color conversion table using the color conversion table pre-stored in the storage 140. The RGB 3D color matrix of the color conversion table may be generated using the regression technology.

In addition, the changer 170 may compare the range of brightness of the compensation chart and the range of brightness of the pre-stored color conversion table, and generate a new gamma curve according to a result of the comparing. This operation will be explained below with reference to FIG. 5.

In addition, the changer 170 may correct the color conversion table based on the generated gamma curve. The gamma curve may be generated for the color of each engine, and the operation of correcting the color conversion table according to the generated gamma curve may be performed along with an operation of redefining an RGB color mapping characteristic, which will be described later.

In addition, the changer 170 may compare the RGB 3D color matrix of the compensation chart and the RGB 3D color matrix of the color conversion table. In this case, the changer 170 may compare the RGB 3D color matrix of the compensation chart and the RGB 3D color matrix of the color conversion table using a 3D interpolation method.

In addition, the changer 170 may redefine the RGB color mapping characteristic of the image forming apparatus based on a result of the comparing. Specifically, the changer 170 may update the color conversion table using the RGB color mapping characteristic refined to have the RGB color values of the color conversion table. In this case, the changer 130 may update the color conversion table by considering the gamma curve generated in the prior process.

In addition, in response to a user's favorite color brightness range for each color of the CMYK being selected through the manipulation inputter 130, the changer 170 may change the color conversion table by reflecting the selected user's favorite color brightness range.

The controller 180 may control the respective elements of the image forming apparatus 100. Specifically, in response to the color revision initiation command being received from the user through the manipulation inputter 130, the controller 180 may control the image former 150 to print the compensation chart, and may control the scanner 160 to scan the printed compensation chart.

In addition, the controller 180 may control the changer 170 to update the color conversion table pre-stored in the storage 140 using the scanned compensation chart.

According to an exemplary embodiment described above, the image forming apparatus 100 may print the compensation chart and scan the printed compensation chart, thereby easily revising colors. In addition, the image forming apparatus 100 according to an exemplary embodiment understands the range of brightness that the image forming apparatus 100 can currently represent, and thus can minimize a color deviation which is caused by hardware change, that is, a color deviation which is caused as the image forming apparatus 100 is used for a long time.

In FIG. 2, the image forming apparatus 100 directly scans the printed compensation chart. However, in practice, the image forming apparatus may not be provided with the scanner, and may receive the compensation chart scanned by another image reading apparatus and use the compensation chart. In addition, the compensation chart may be photographed rather than being scanned. For example, the printed compensation chart may be photographed by a camera of the mobile device, which will be described later, and the image forming apparatus 100 may receive the photographed scan image.

Figure 3:
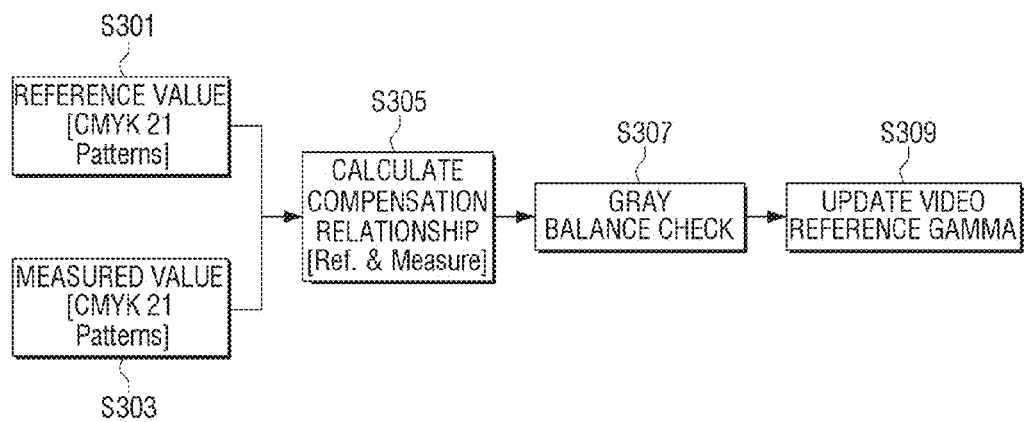
FIG. 3 is a view to illustrate the operation of a changer of FIG. 2.

FIG. 3 is a view to illustrate the operation of the changer of FIG. 2.

Referring to FIG. 3, the changer 170 may identify a reference color value using the pre-stored color conversion table (S301). The reference color value is a color value which is generated by a product developer in the process of optimizing a corresponding product, that is, may be a value which is obtained using the compensation chart of FIG. 3 in the initial state of all environments and consumables.

In addition, the changer 170 may identify a color value which is obtained through the compensation chart (S303). The obtained color value herein refers to a value of a current state of each of the C/M/Y/K/Composite black colors which is obtained using the compensation chart in the current state.

Next, the changer 170 may generate a new compensation curve using the color value at the initial releasing time of the product and the current color value (S305). The operation of generating the compensation curve will be explained in detail below with reference to FIG. 5.

In addition, the changer 170 may perform a gray balance check process according to the generated compensation curve (S307). The gray balance check process recited herein aims at preventing an error of biasing a gray color area to a specific color, and, when the above-described compensation and gray balance check process are completed, the changer 170 may generate a gamma curve reference value, and update the reference value of the gamma curve of the auto conversion function of the video signal of the engine with reference to the gamma curve reference value (S309).

Specifically, the engine may correct the color brightness range of the engine automatically at regular intervals and according to a specific running environment. The reference value is provided to correct the color brightness range, and the reference value serves to adjust the gamma curve of an output set. Therefore, the final value generated in the above-described process may be an update reference value of the gamma curve. That is, a change in the reference value of the CTD sensor for auto-correcting a video signal may be compensated for through a scanner sensor connected with a set.

FIG. 4 is a view showing an example of a compensation chart according to an exemplary embodiment.

Referring to FIG. 4, the compensation chart according to an exemplary embodiment may include a first area 410, a second area 420, a third area 430, and a fourth area.

The first area 410 includes two gradation areas arranged in the print direction (or scan direction) in line and arranged on the left 411 and the right 412 of the third area 430. The first areas 410 may be distanced from each other to determine whether a color brightness range deviation (that is, the left side and the right side) exists in the printed compensation chart or the scanner 160.

The gradation area is an area where colors (cyan/magenta/yellow/black/composite black (black made by mixing CMY) are distinguished from one another and arranged in a first direction (X-axis direction), and brightness levels of each color are arranged in a second direction (Y-axis direction or printing direction) perpendicular to the first direction. One color is divided into 12 to 25 areas, and the divided areas may have different levels of brightness (color brightness ranges) in phases. The divided areas fall within all of the ranges that can be ideally represented.

Accordingly, the image forming apparatus 100 may revise colors using the first area 410, and also, may determine whether there is left and right uniformity using the first area 410. Specifically, the image forming apparatus 100 may determine whether there is left and right uniformity in advance, and, only when there is the left and right uniformity, may revise the colors as described above. That is, if there is no left and right uniformity, a compensation chart which does not exactly revise colors would be used or there would be a mechanical problem. Therefore, the image forming apparatus 100 may not revise the colors.

The second area 420 may include a plurality of black areas and a plurality of white areas arranged at the four corners of the first area 410 apart from one another. Specifically, the second area 420 includes areas arranged on the left upper side 421, the left lower side 423, the right upper side 422, and the right lower side 424 of the first area 410, respectively. The second area 420 is an area for identifying the up and right uniformity and the left and right uniformity of a K channel and a deviation between a reference value and a current scan value, and may identify uniformity on paper color.

The third area 430 is a color pattern which is used to correct a color brightness range, and includes 27 color patterns which divide primary colors and neighboring colors thereof by three levels of brightness.

The fourth area 440 is an area in which a predetermined shape is printed. The fourth area 440 is an area for identifying distortion of the compensation chart and the degree of inclination with respect to the X-axis and the Y-axis.

The compensation chart according to an exemplary embodiment includes the CMYK colors the brightness of which is changed, and the image forming apparatus 100 may understand the range of brightness that the image forming apparatus 100 can represent using the compensation chart. In addition, the compensation chart includes the areas for identifying the left and right uniformity, and thus the image forming apparatus 100 can identify the uniformity of the image former 150 and the scanner 160 and revise the colors.

Figure 5:
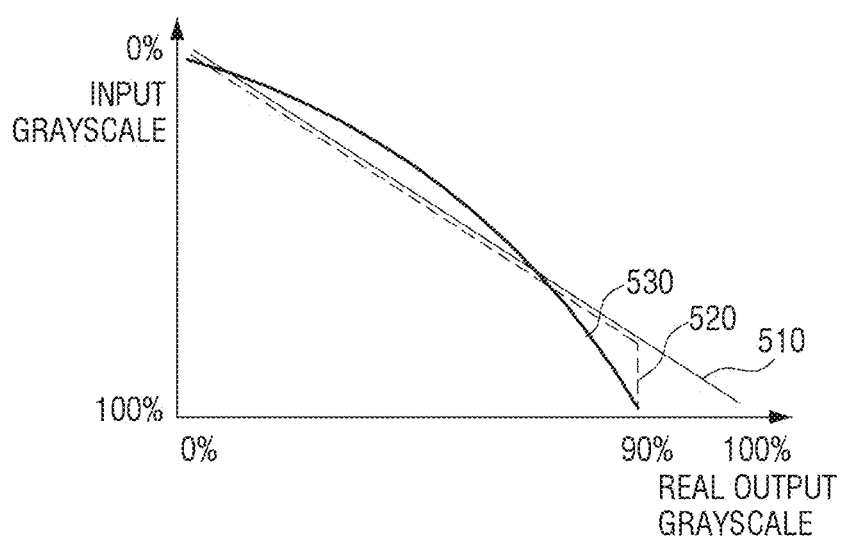
FIG. 5 is a view to illustrate an operation of generating a compensation curve.

FIG. 5 is a view to illustrate an operation of generating a compensation curve.

FIG. 5 illustrates three relation graphs between an input gray scale and an really output gray scale.

First, the first relation graph 510 indicates the relation between the input gray scale and the output gray scale at the time when the image forming apparatus 100 is initially released as a product. The engine of the image forming apparatus can output the gray scale according to the input gray scale.

The second and third relation graphs 520 and 530 indicate the relation between the input gray scale and the output gray scale as the image forming apparatus 100 is worn out. According to these graphs, regarding a part of the input gray scale, it is difficult to output the gray scale according to the input gray scale. The second relation graph 520 shows the relation when the colors are revised in a related-art method. According to the second relation graph 520, the same gray scale may be outputted for the high input gray scale, and, when an image having a high input gray scale is inputted, there may be considerable distortion in an outputted image.

The third relation graph 530 is a relation graph when the compensation curve according to an exemplary embodiment is applied. The newly generated compensation curve uniformly distributes the input gray scale regarding the range of brightness that the image forming apparatus can currently support. Therefore, even when an image having a high input gray scale is inputted, an image having a gray scale difference between high gray scales may be outputted.

Figure 6:
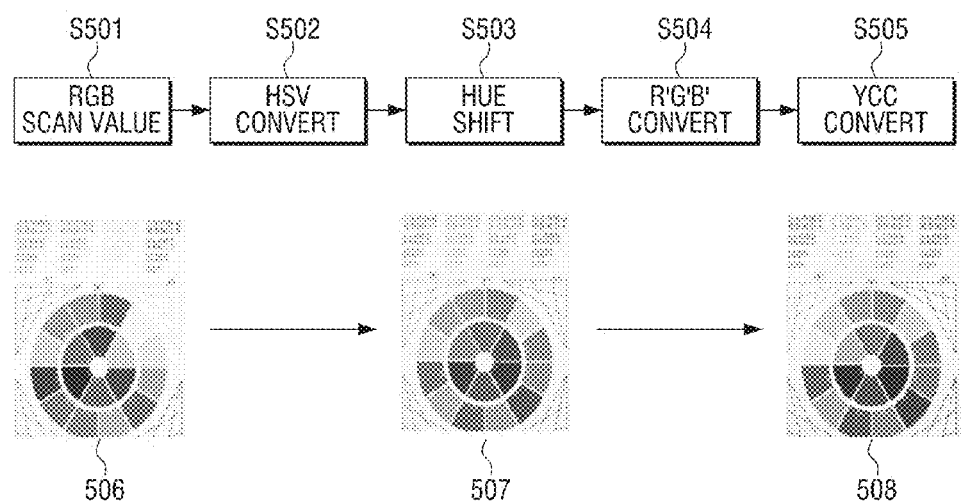
FIG. 6 is a view to illustrate an operation of converting brightness according to an exemplary embodiment.

FIG. 6 is a view to illustrate an operation of converting brightness according to an exemplary embodiment.

When a brightness value is directly extracted from color values of the RGB color space, an output color characteristic of yellow is not exactly represented. Therefore, to prevent information loss on the yellow color value, the brightness value is extracted through the following conversion operation according to an exemplary embodiment.

First, RGB color values 506 are extracted from the scanned compensation chart (S501).

In addition, the extracted color values of the RGB color space 506 are converted into a Hue Saturation Value (HSV) color space 507 (S502). The color space method is a well-known method and thus a detailed description thereof is omitted.

Only the hue value of the HSV color space 507 may be converted into the RGB color space (S503, S504), and the RGB values of the converted RGB color space may be converted into an YCC color space 508 (S505). In addition, a brightness component in the YCC color space may be used as a brightness component of the compensation chart.

Figure 7:
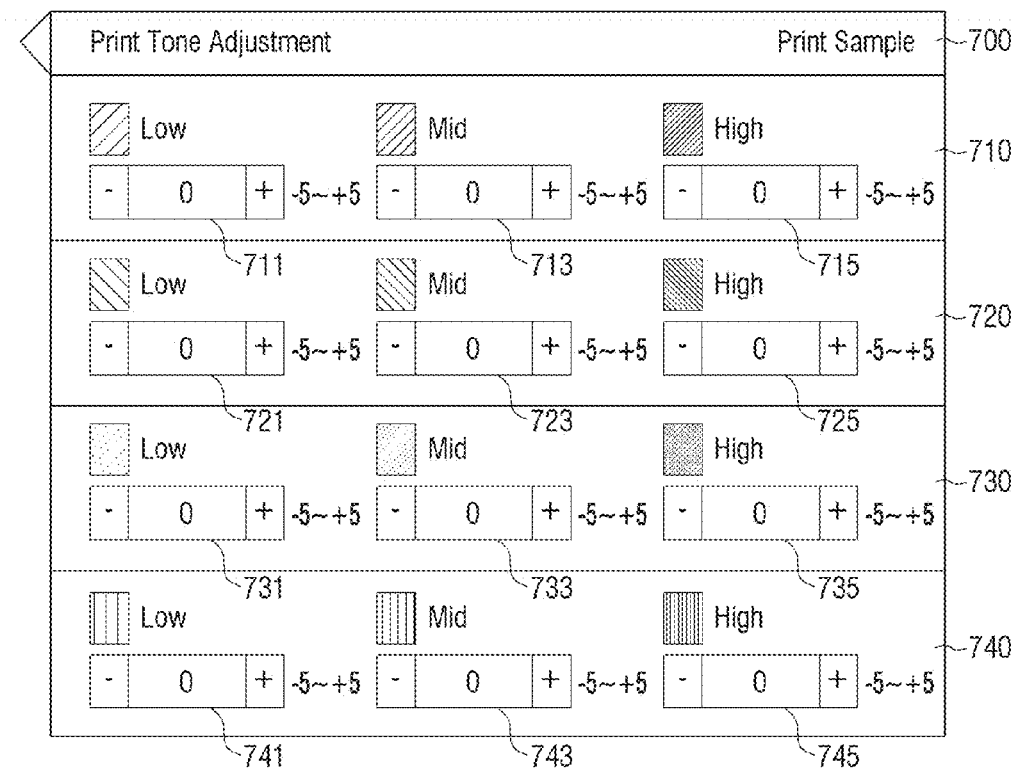
FIGS. 7 to 9 are views showing examples of a user interface window which is displayable on a display of FIG. 2.
Figure 8:
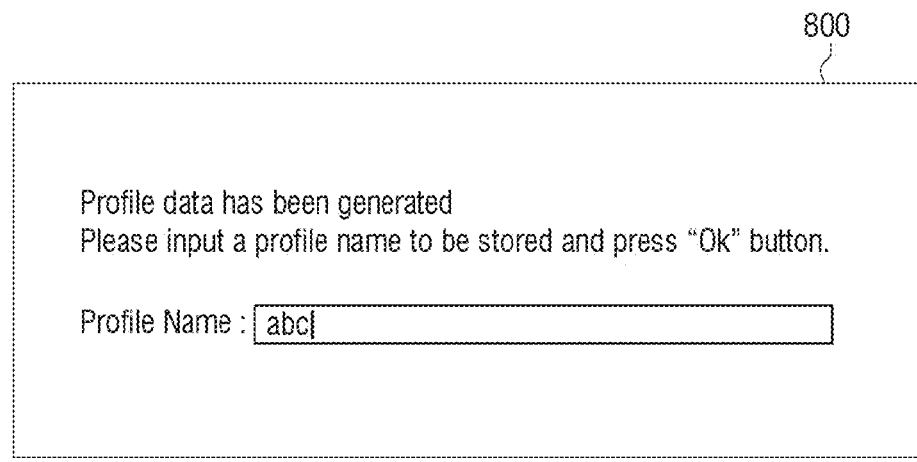
Figure 9:
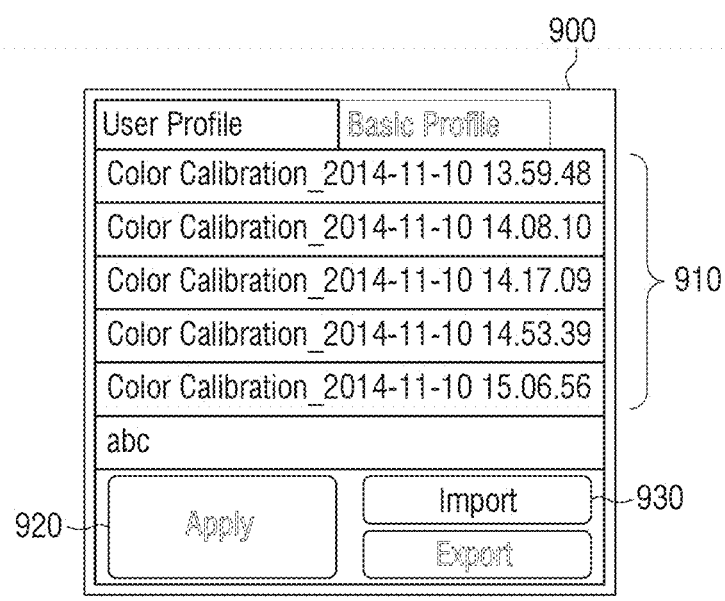

FIGS. 7 to 9 are views showing examples of a user interface window which is displayable on the display of FIG. 2.

Specifically, FIG. 7 illustrates an example of a user interface window to receive input of user adjustment of a color brightness range.

Referring to FIG. 7, a user interface window 700 may include a cyan adjustment area 710, a magenta adjustment area 720, a yellow adjustment area 730, and a black adjustment area 740.

The cyan adjustment area 710 is an area for receiving selection of a user's favorite color brightness range for cyan, and may receive selection of a user's favorite color brightness for each of a low color brightness area 711, a middle color brightness area 713, and a high color brightness area 715.

The magenta adjustment area 720 is an area for receiving selection of a user's favorite color brightness range for magenta, and may receive selection of a user's favorite color brightness for each of a low color brightness range area 721, a middle color brightness area 723, and a high color brightness area 725.

The yellow adjustment area 730 is an area for receiving selection of a user's favorite color brightness range for yellow, and may receive selection of a user's favorite color brightness for each of a low color brightness area 731, a middle color brightness area 733, and a high color brightness area 735.

The black adjustment area 740 is an area for receiving selection of a user's favorite color brightness for black, and may receive selection of a user's favorite color brightness for each of a low color brightness area 741, a middle color brightness area 743, and a high color brightness area 745.

In response to the user's favorite color brightness range being inputted through the user interface window 700, the image forming apparatus 100 may print a test page reflecting the user's favorite color brightness range. The inputting the user's favorite color brightness range and the printing the test page may be repeated until the user firmly decides the color brightness range.

FIG. 8 is a view showing an example of a user interface window to receive input of a name of a new profile.

Referring to FIG. 8, when a new compensation curve is generated in the above-described process and thus a color conversion table needs to be updated, or when the color conversion table needs to be updated according to the input of a user's favorite color brightness range, the storage 130 may store a plurality of color conversion tables. In this case, a user interface window 800 may include an area for receiving input of names from the user to receive input of names of color conversion tables in order to distinguish the plurality of color conversion tables from one another.

FIG. 9 is a view showing a user interface window which displays pre-stored profiles.

Referring to FIG. 9, a user interface window 900 may include an area 910 for displaying pre-stored profiles, and control command areas 920, 930 for a selected profile.

Through the user interface window 900, the user may easily select a profile to be applied to a current job from among various profiles pre-stored by the user.

Figure 10:
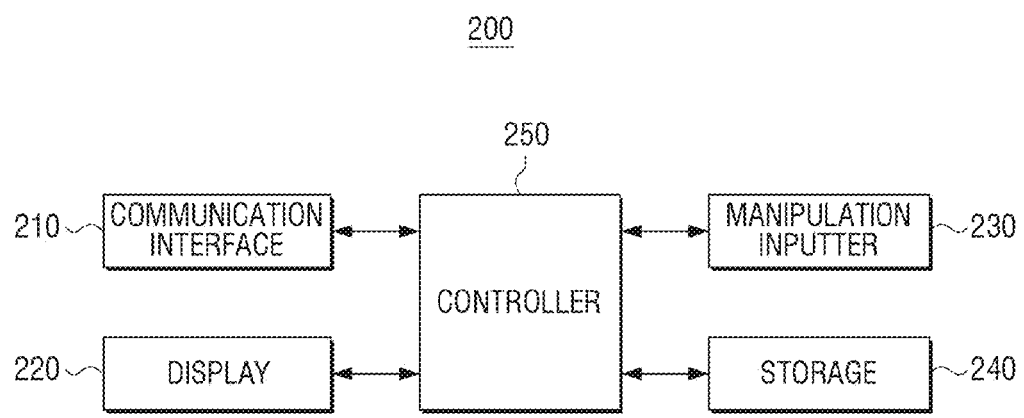
FIG. 10 is a view showing a configuration of a mobile device of FIG. 1.

FIG. 10 is a view showing the configuration of the mobile device of FIG. 1.

Referring to FIG. 10, the mobile device 200 may include a communication interface 210, a display 220, a manipulation inputter 230, a storage 240, and a controller 250. The mobile device 200 may be a laptop, a mobile phone, a smartphone, a PMP, an MP3 player, or etc. which may communicate with the image forming apparatus 100 and is movable.

The communication interface 210 is configured to connect the mobile device 200 with an external device, and may access through a Local Area Network (LAN) and the Internet, and also, may access through a USB port and a wireless module. The wireless module may be WiFi, WiFi Direct, Near Field Communication (NFC), Bluetooth, Infrared Ray (IR), etc.

The communication interface 210 may search for the image forming apparatus 100 connectible therewith. The communication interface 210 may receive information on the functions that the image forming apparatus 100 connectible therewith can perform, and the operation state. In this case, the communication interface 210 may receive information for controlling the functions of the image forming apparatus 100 and setting options of the functions, and may receive UIs for controlling the functions and setting the options of the functions.

In addition, the communication interface 210 may receive information on the functions supported by the selected image forming apparatus 100 and options of a corresponding function. Specifically, the communication interface 210 may receive information for displaying UIs for the user to select a function of the image forming apparatus 100 and set the options of the function, and also, may directly receive the UIs related to the selection of the function of the image forming apparatus 100 and the setting of the options of the function.

In addition, the communication interface 210 may transmit a function control command and a color revision initiation command to the selected image forming apparatus 100.

In addition, the communication interface 210 may receive information on the progress state of a job in the image forming apparatus 100, and may receive a notification indicating that the job is completed in response to the print job or scan job being completed in the image forming apparatus 100. The communication interface 210 may receive scan data which is a scan output.

The display 220 may display a variety of information which is supported in the mobile device 200. The display 220 may be a monitor such as an LCD, a CRT, etc., and may be implemented by using a touch screen which performs the function of the manipulation inputter 230, which will be described below, simultaneously.

In addition, the display 220 may display a list of applications installed in the mobile device 200. The display 220 may display an execution screen resulting from a driven application.

In addition, the display 220 may display a screen for receiving selection of a job to be performed in the image forming apparatus. Specifically, the display 220 may display a screen for receiving input of a function to be performed in the selected image forming apparatus and an option of the function (for example, a scan option, etc.).

In addition, the display 220 may display the progress state of a requested job. In addition, in response to receiving information that a scan job is completed from the image forming apparatus 100 through the communication interface 210, the display 220 may display information that the requested job is completed.

Various user interface windows which are displayable on the display 220 will be explained below with reference to FIGS. 11 to 13.

The manipulation inputter 230 may be provided with a plurality of function keys through which the user may set or select the various functions supported by the mobile device 200. The manipulation inputter 230 may be implemented by using a device such as a mouse, a keyboard, or etc., and may be implemented by using a touch screen which performs the function of the above-described display 220 simultaneously.

In addition, the manipulation inputter 230 may receive input of an application driving command. Specifically, when the user wishes to perform a job using the image forming apparatus, the user may drive an application installed in the mobile device 200 or may input a driving command on a web browser application to access a specific web page.

In addition, the manipulation inputter 230 may receive selection of a specific application from the list of applications installed in the mobile device 200, which is displayed on the display 220.

In addition, the manipulation inputter 230 may receive input of a job to be performed in the image forming apparatus. Specifically, the manipulation inputter 230 may receive input of a function to be performed in the selected image forming apparatus and an option of the function (for example, a scan option, etc.).

The storage 240 may store a variety of information and scan data which are received through the communication interface 210. The storage 240 may be implemented by using a storage medium in the mobile device 200 and an external storage medium, for example, a removable disk including a USB memory, a web server through a network, etc.

The controller 250 may control the respective elements of the mobile device 200. Specifically, in response to a driving command of an application to use the image forming apparatus being inputted from the user, the controller 250 may control the communication interface 210 to search for the image forming apparatus connectible therewith.

In addition, the controller 250 may control the display 220 and the manipulation inputter 230 to display the searched image forming apparatus and select the image forming apparatus. In addition, the controller 250 may control the display 220 and the manipulation inputter 230 to receive selection of a function to be performed in the image forming apparatus and a function option.

The mobile device 200 according to an exemplary embodiment as described above may control the image forming apparatus and thus can easily maintain the image forming apparatus 100.

Figure 11:
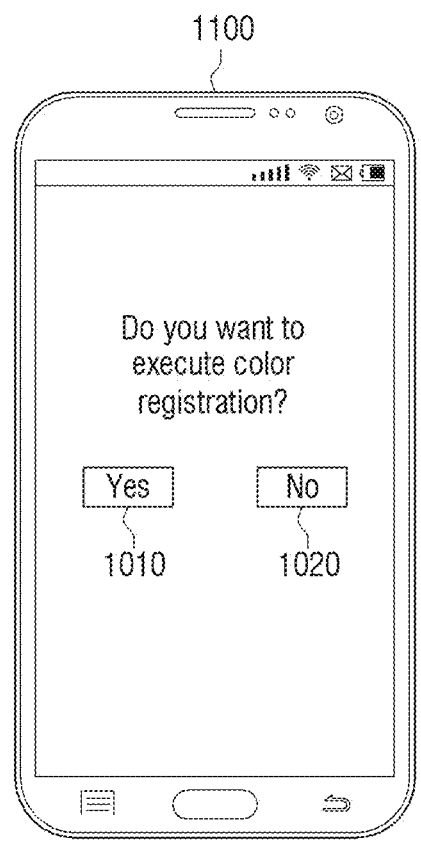
FIGS. 11 to 13 are views showing examples of a user interface window which is displayable on a user interface of FIG. 10.
Figure 12:
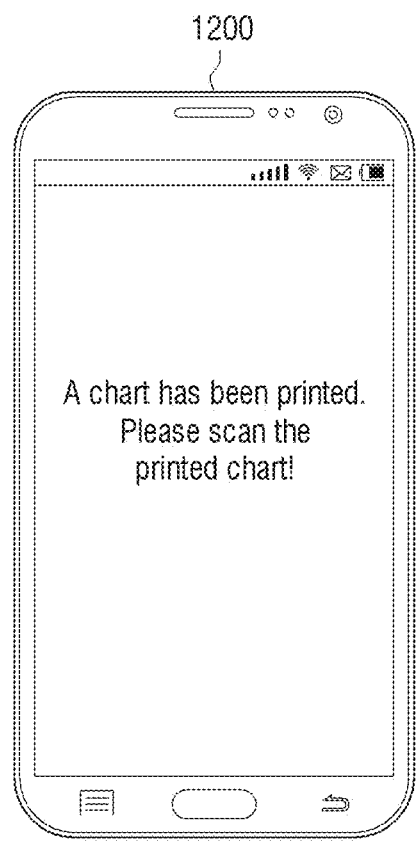
Figure 13:
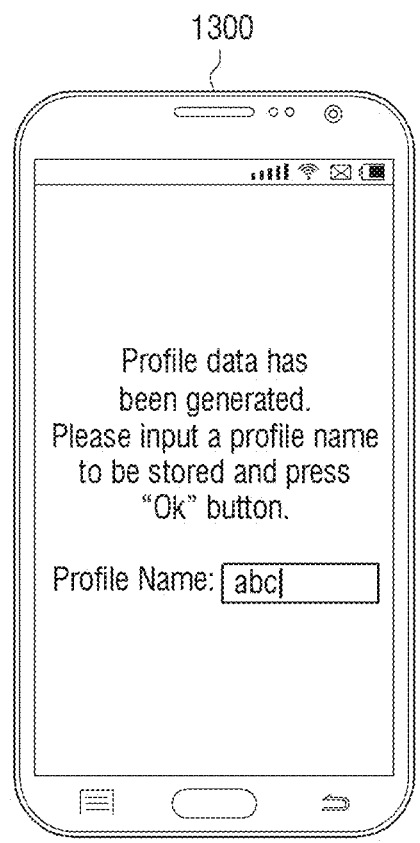

FIGS. 11 to 13 are views showing examples of a user interface window which is displayable on the mobile device of FIG. 10.

Specifically, FIG. 11 is a view showing an example of a user interface window to receive input of a color revision initiation command.

Referring to FIG. 11, when the number of copies of the image forming apparatus is more than or equal to a predetermined number, the user interface window 1100 may ask whether the user wishes to revise colors of the image forming apparatus. In this case, in response to the user selecting a "NO" area 1020, the mobile device 200 may display a user interface window to receive input of a normal control command on the image forming apparatus 100.

On the other hand, in response to the user selecting a "Yes" area 1010, the mobile device 200 may transmit a color revision initiation command to the image forming apparatus 100.

Accordingly, the image forming apparatus 100 prints the compensation chart and informs the mobile device 200 that the compensation chart has been printed. Accordingly, the mobile device 200 may display a user interface window as shown in FIG. 12.

FIG. 12 is a view showing an example of a user interface window which is displayed on the mobile device when the compensation chart is printed in the image forming apparatus.

Referring to FIG. 12, the user interface window 1200 may display a message informing that the compensation chart has been printed, and a message requesting a scan job for the compensation chart.

When the user scans the compensation chart in response to the request, and accordingly, a new color conversion table is generated, the mobile device 200 may request the user to input a name of a profile for the color conversion table.

FIG. 13 is a view showing an example of a user interface window for receiving input of a name of a new profile in the mobile device.

Referring to FIG. 13, when a new compensation curve is generated in the above-described process and thus a color conversion table needs to be updated, or when the color conversion table needs to be updated according to the input of a user's favorite color brightness range, the storage 130 may store a plurality of color conversion table s. In this case, the user interface window 1300 may include an area for receiving input of a name from the user to receive input of a name of each color conversion table in order to distinguish the plurality of color conversion tables from one another.

In the above-described exemplary embodiment, the newly generated color conversion table is stored in the image forming apparatus 100, but in practice, a color conversion table for a specific user may be stored in the mobile device 200. Accordingly, when a printing job is performed, the mobile device 200 may transmit printing data and the color conversion table described in the mobile device 200 to the image forming apparatus 100, such that the printing job is performed.

In addition, the mobile device 200 may store the name of the profile generated by the corresponding user, and the mobile device 200 may transmit a printing command to perform the printing job in the name of the corresponding profile.

Figure 14:
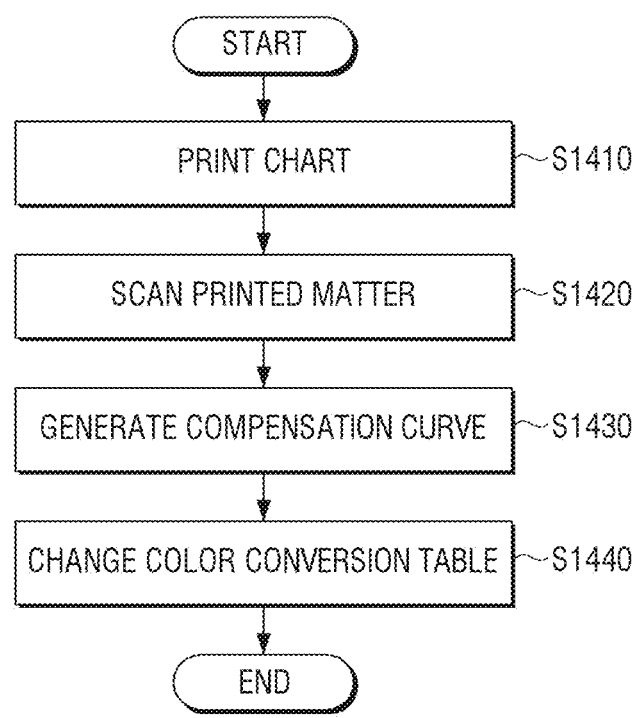
FIG. 14 is a flowchart to illustrate brief steps of a method for revising colors according to an exemplary embodiment.

FIG. 14 is a flowchart to illustrate brief steps of a color revision method according to an exemplary embodiment.

Referring to FIG. 14, first, a compensation chart corresponding to a pre-stored color conversion table is printed (S1410). Specifically, a color brightness range for the engine in the image forming apparatus may be initialized and the compensation chart may be printed using the engine the color brightness range of which is initialized. The compensation chart includes a gradation area in which color values of different color brightness ranges are arranged serially. The form of the compensation chart has been described above with reference to FIG. 4, and thus a redundant explanation is omitted.

The printed compensation chart is scanned (S1420). In practice, the printed compensation chart may be scanned using a scan function of another device rather than using the scanner in the image forming apparatus, and image data of the scanned compensation chart may be received.

The range of brightness that the image former can represent is understood using the scanned compensation chart, and a gamma curve corresponding to the understood range of brightness is generated (S1430). Specifically, RGB color values are extracted from the scanned compensation chart, the extracted RGB color values are converted into an YCC color space, brightness values are extracted from the YCC color space, and the range of brightness is understood using the extracted brightness values. The gamma curve may be generated in the method shown in FIG. 5.

The color conversion table is changed based on the generated gamma curve (S1440).

Accordingly, the color revision method according to an exemplary embodiment prints the compensation chart and scans the printed compensation chart, thereby easily revising colors. In addition, the color revision method according to an exemplary embodiment understands the range of brightness that the image forming apparatus 100 can currently represent, and thus can minimize a color deviation which is caused by hardware change, that is, a color deviation which is caused as the image forming apparatus is used as a long time. The color revision method in FIG. 14 may be implemented on the image forming apparatus having the configuration of FIG. 2, or may be implemented on an image forming apparatus having other configurations.

In addition, the driving method of the image forming apparatus as described above may be implemented by a program including an algorithm executable in a computer, and the above-described program may be stored in a non-transitory computer readable medium and provided.

The non-transitory readable medium refers to a medium that stores data semi-permanently rather than storing data for a very short time, such as a register, a cache, a memory or etc., and is readable by an apparatus. Specifically, the above-described various applications or programs may be stored in the non-transitory readable medium, such as a compact disc (CD), a digital versatile disk (DVD), a hard disk, a Blu-ray disk, a universal serial bus (USB), a memory card, a read only memory (ROM), or etc., and provided.

Figure 15:
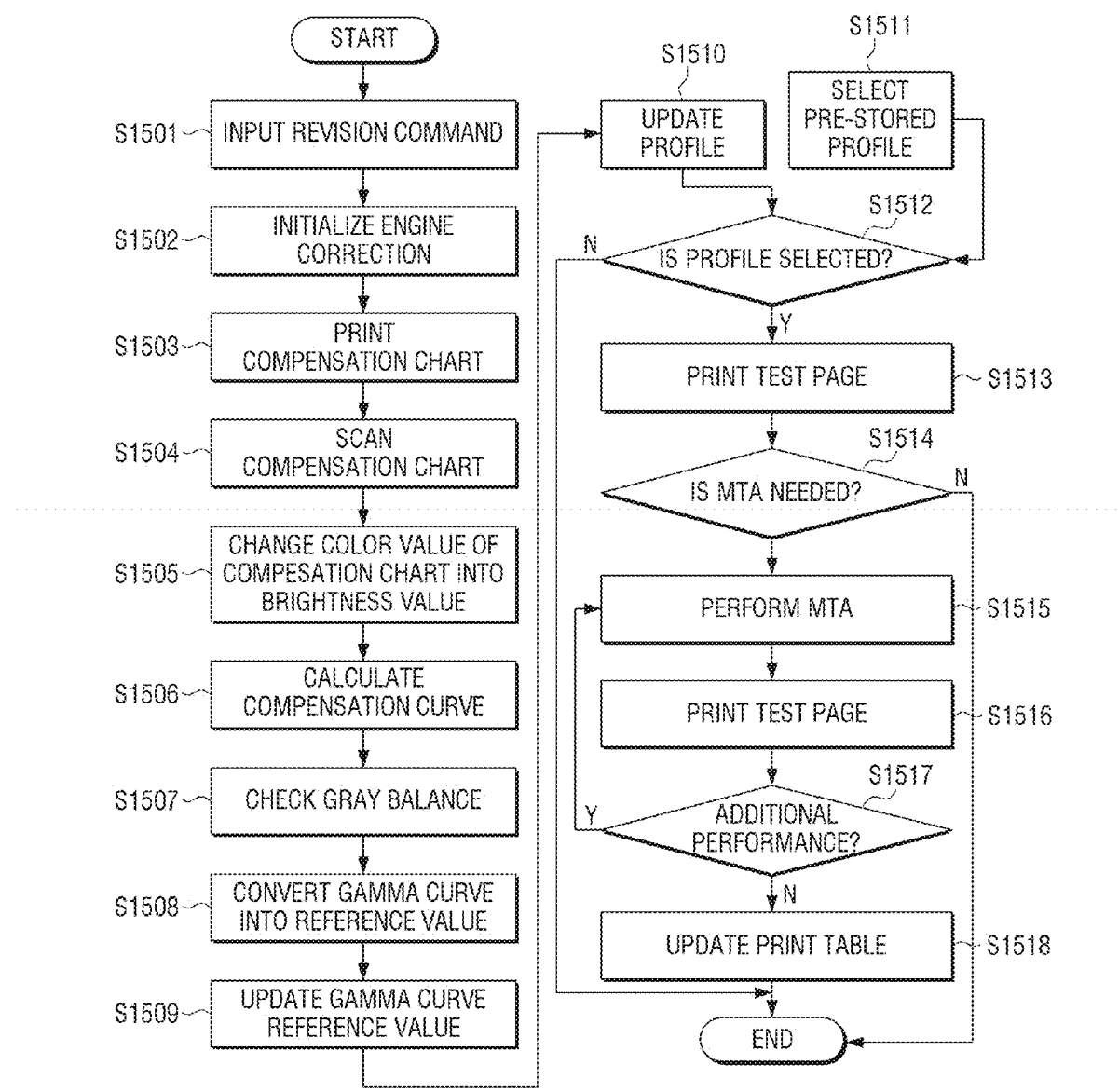
FIG. 15 is a flowchart to illustrate detailed steps of a method for revising colors according to an exemplary embodiment.

FIG. 15 is a flowchart showing detailed steps of a color revision method according to an exemplary embodiment.

Referring to FIG. 15, first, a color revision command is received (S1501). Specifically, one of an initial output characteristic maintenance command and a color characteristic change command may be received from the user. The initial output characteristic maintenance command is a color revision command for the image forming apparatus 100 to maintain an initial output characteristic, and the color characteristic change command is a color revision command to have a user's favorite output characteristic. In addition, such a color revision command may be directly inputted through a manipulation inputter provided in the image forming apparatus, and also, may be inputted through an external mobile device.

Next, an engine may be corrected (S1502). Specifically, engine correction may be initialized based on a reference value pre-defined through a sensing unit which is provided in the image former. Through this process, the sensing unit may be initialized and the engine may be initialized. Herein, the initialization of the sensing unit may be performed by forming a predetermined toner concentration pattern on an intermediate transfer belt to initialize a CTD sensor provided in the image former, reading out the corresponding pattern through the CTD sensor, and initializing the CTD sensor, or may be performed by reading out a concentration value on the intermediate transfer belt on which a pattern is not formed, without generating the toner concentration pattern, and initializing the CTD sensor. Such an initializing operation of the sensing unit may be omitted when an initializing operation of a previous sensing unit is performed within a predetermined time.

Next, a compensation chart may be printed (S1503). Specifically, the compensation chart includes gradation patterns of Cyan/Magenta/Yellow/Black/Composite Black configured by a plurality of levels. The gradation pattern may be arranged on the left and right sides in a paper advancing direction. In addition, the compensation chart may further include black/white patterns arranged in the left upper/right upper/left lower/right lower directions on paper, for analyzing an engine state. In addition, the compensation chart may further include a pattern for Manual Tone Adjustment (MTA).

The printed compensation chart may be scanned (S1504). A color conversion process may be performed with respect to color values arranged in the scanned compensation chart (S1505). Specifically, the color conversion process as shown in FIG. 6 may be performed to exactly represent the characteristic of an engine due to the characteristic of yellow toner.

In addition, the converted color value and a pre-stored reference value may be compared with each other (S1506). The reference value is a color value which is generated by a product developer in the process of optimizing a corresponding product, that is, may be a value which is obtained using the compensation chart of FIG. 3 in the initial state of all environments and consumables. In addition, the converted color value refers to a value of a current state for C/M/Y/K/Composite Black colors which is obtained using the compensation chart in the current state.

Accordingly, a new compensation curve may be generated using the color value at the initial releasing time of the product and the current color value (S1506), and a gray balance check process may be performed according to the generated compensation curve (S1507). The gray balance check process recited herein aims at preventing an error of biasing a gray color area to a specific color, and, when the above-described compensation and gray balance check process are completed, a gamma curve reference value may be generated (S1508), and the reference value of the gamma curve of the auto conversion function of the video signal of the engine may be updated with reference to the gamma curve reference value (S1509).

Specifically, the engine may correct the color brightness range of the engine automatically at regular intervals and according to a specific running environment. The reference value is provided to correct the color brightness range, and the reference value serves to adjust the gamma curve of an output set. Therefore, the final value generated in the above-described process may be an update reference value of the gamma curve (S1509). That is, a change in the reference value of the CTD sensor for auto-correcting a video signal may be compensated for through a scanner sensor connected with a set.

The compensation curve value generated through the above-described process is stored in the storage as a new profile (S1510), and a recently generated profile may be applied when colors are revised, except for the case in which the user selects a specific profile (S1511).

The user may input the color revision command to maintain the initial output characteristic or may input the color revision command to change the color characteristic. To revise the colors, the image forming apparatus may print a test page having various brightness values (S1513). The test page may be separate from the above-described compensation chart or may be included in the compensation chart as one area.

Accordingly, in response to the user's request to print the compensation chart and revise colors (S1514), user's preference on each of C/M/Y/K colors in each of the low/middle/high areas may be received (S1515, S1516).

In response to receiving the user's preference, a test page corresponding to the user's preference inputted by the user is outputted again, and the color conversion table may be updated as the user firmly decides.

Figure 16:
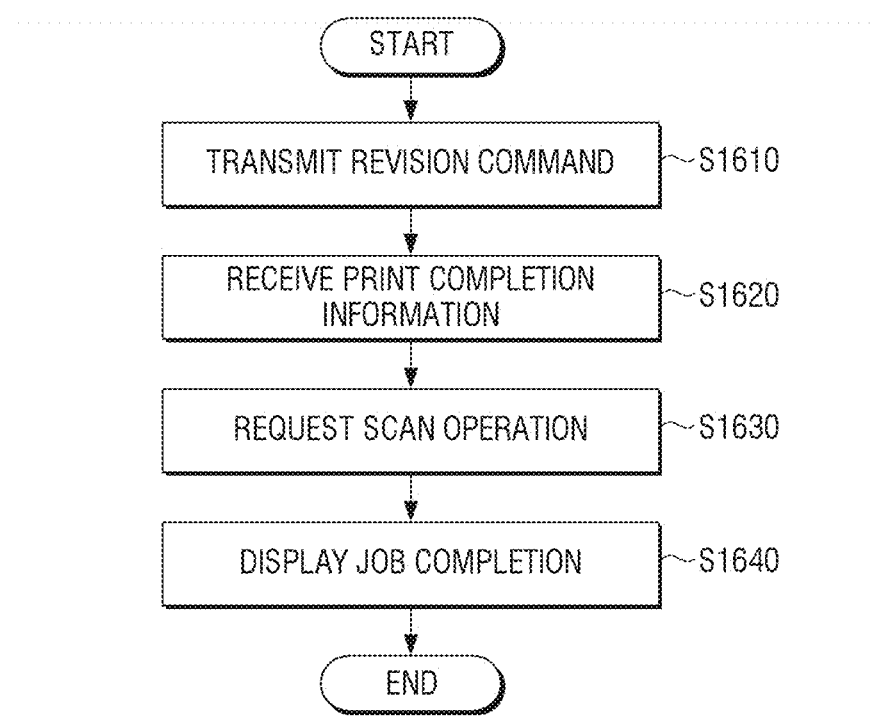
FIG. 16 is a flowchart to illustrate a method for controlling of an image forming apparatus according to an exemplary embodiment.

FIG. 16 is a flowchart to illustrate a control method of an image forming apparatus according to an exemplary embodiment.

Referring to FIG. 16, in response to the user driving an application for controlling the function of the image forming apparatus, a user interface window for controlling the function of the image forming apparatus is displayed.

In response to the user inputting a color revision command through the displayed user interface window, the mobile device may transmit the color revision command to the image forming apparatus 100 (S1610).

In response to the color revision command, the image forming apparatus may print a compensation chart. In response to the compensation being printed, the mobile device 200 may be notified by the image forming apparatus that the compensation chart has been printed (S1620).

In response to this notification, the mobile device 200 may display a message requesting the user to scan the printed compensation chart to perform an additional job (S1630).

In response to the request, the user scans the compensation chart and completes color revision. Then, the mobile device may be notified by the image forming apparatus that the color revision is completed (S1640).

In practice, a user color brightness range correction process may be performed after the color revision process.

Accordingly, in the control method according to an exemplary embodiment, the mobile device 200 can control the image forming apparatus in the mobile device 200, and can easily maintain the image forming apparatus 100. The control method in FIG. 16 may be implemented on the mobile device having the configuration of FIG. 10, or may be implemented on a mobile device having other configurations.

The control method as described above may be implemented by a program including an algorithm executable in a computer, and the above-described program may be stored in a non-transitory computer readable medium.

The non-transitory computer readable medium does not mean a medium storing data for a short period such as a register, a cash, or the like, but means a machine-readable medium semi-permanently storing the data. Specifically, various applications or programs described above may be stored and provided in the non-transitory computer readable medium such as a compact disc (CD), a digital versatile disk (DVD), a hard disk, a Blu-ray disk, a universal serial bus (USB), a memory card, a read-only memory (ROM), or the like.

Moreover, processes, functions, methods, programs applications, and/or software in apparatuses described herein may also be recorded, stored, or fixed in one or more non-transitory computer-readable media (computer readable storage (recording) media) that includes program instructions (computer readable instructions) to be implemented by a computer to cause one or more processors to execute (perform or implement) the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media, optical media, magneto-optical media, and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more non-transitory computer-readable media, in order to perform the operations and methods described above, or vice versa. In addition, the computer-readable media may also be embodied in at least one application specific integrated circuit (ASIC) or Field Programmable Gate Array (FPGA).

Hereinabove, although exemplary embodiments of the present disclosure have been shown and described, it should be understood that the present disclosure is not limited to the disclosed embodiments and may be variously changed by those skilled in the art without departing from the spirit and the scope of the present disclosure. Therefore, the present disclosure should be construed as including all the changes, equivalents, and substitutions included in the spirit and scope of the present disclosure.

What is claimed is:

1. An image forming apparatus comprising:
   a storage to store a color conversion table;
   an image former to print a compensation chart corresponding to the color conversion table;
   a scanner to scan the printed compensation chart; and
   at least one processor to:
      recognize a range of brightness that the image former is able to provide to an image to be printed using the scanned compensation chart,
      generate a compensation curve that uniformly distributes an input grayscale based on the recognized range of brightness,
      generate a gamma curve corresponding to the generated compensation curve, and
      change the color conversion table based on the generated gamma curve.

2. The image forming apparatus of claim 1, wherein the compensation chart comprises a gradation area in which color values of different color brightness ranges are arranged serially, and the at least one processor uses the gradation area to recognize the range of brightness that the image former is able to provide.

3. The image forming apparatus of claim 2, wherein the gradation area comprises:
   a cyan area in which cyan colors of different color brightness ranges are arranged serially;
   a magenta area in which magenta colors of different color brightness ranges are arranged serially;
   a yellow area in which yellow colors of different color brightness ranges are arranged serially; and
   a black area in which black colors of different color brightness ranges using a black toner are arranged serially,
   wherein the at least one processor uses the cyan area, the magenta area, the yellow area, and the black area to recognize the range of brightness that the image former is able to provide.

4. The image forming apparatus of claim 3, wherein
   the gradation area further comprises a composite black area in which black colors of different color brightness ranges using CMY toners are arranged serially, and the at least one processor further uses the composite black area to recognize the range of brightness that the image former is able to provide.

5. The image forming apparatus of claim 2, wherein the compensation chart further comprises another area having a plurality of black colors displayed at four corners of the gradation area apart from one another, and the at least one processor further uses the plurality of black colors to recognize a range of brightness that the image former is able to provide.

6. The image forming apparatus of claim 1, wherein the compensation chart comprises a plurality of gradation areas which are arranged at a distance from one another, and the at least one processor uses the plurality of gradation areas to recognize the range of brightness that the image former is able to provide.

7. The image forming apparatus of claim 6, wherein the plurality of gradation areas in which color values of different color brightness ranges are arranged serially, and the at least one processor uses the serially arranged plurality of gradation areas to recognize the range of brightness that the image former is able to provide.

8. The image forming apparatus of claim 1, wherein, to recognize the range of brightness, the at least one processor
converts RGB color values of the scanned compensation chart into a YCC color space, and
recognizes the range of brightness that the image former is able to provide to the image to be printed based on the YCC color space.

9. The image forming apparatus of claim 8, wherein, to convert the RGB color values into the YCC color space, the at least one processor
converts the RGB color values of the scanned compensation chart into a HSV color space,
converts only a hue value of the HSV color space into an RGB color space, and
converts RGB values of the converted RGB color space into the YCC color space.

10. The image forming apparatus of claim 1, wherein the at least one processor generates a gamma curve corresponding to each of CMYK colors, and the at least one processor uses the gamma curve corresponding to each of the CMYK colors to change the color conversion table.

11. The image forming apparatus of claim 1, further comprising a manipulation inputter to receive selection of a user favorite color brightness range for each of CMYK colors,
wherein the at least one processor changes the color conversion table by reflecting the selected user favorite color brightness range.

12. The image forming apparatus of claim 1, further comprising a communication interface configured to receive input of a color revision initiation command from a mobile device,
wherein, in response to the color revision initiation command being inputted, the image former is configured to print the compensation chart.

13. The image forming apparatus of claim 1, further comprising a communication interface configured to transmit the changed color conversion table to a mobile device.

14. A color revision method of an image forming apparatus, comprising:
printing a compensation chart corresponding to a pre-stored color conversion table;
scanning the printed compensation chart;
recognizing a range of brightness that an image former is able to provide to an image to be printed using the scanned compensation chart;
generating a compensation curve that uniformly distributes an input grayscale based on the recognized range of brightness;
generating a gamma curve corresponding to the generated compensation curve; and
changing the color conversion table based on the generated gamma curve.

15. The color revision method of claim 14, wherein the compensation chart comprises a gradation area in which color values of different color brightness ranges are arranged serially, and the recognizing the range of brightness includes using the gradation area to recognize the range of brightness that the image former is able to provide.

16. The color revision method of claim 15, wherein the gradation area comprises:

a cyan area in which cyan colors of different color brightness ranges are arranged serially;
a magenta area in which magenta colors of different color brightness ranges are arranged serially;
a yellow area in which yellow colors of different color brightness ranges are arranged serially;
a black area in which black colors of different color brightness ranges using a black toner are arranged serially; and
a composite black area in which black colors of different color brightness ranges using CMY toners are arranged serially
wherein the recognizing the range of brightness includes using the cyan area, the magenta area, the yellow area, and the black area to recognize the range of brightness that the image former is able to provide.

17. The color revision method of claim 15, wherein the compensation chart further comprises another area having a plurality of black colors displayed at four corners of the gradation area apart from one another, and the recognizing the range of brightness includes using the plurality of black colors to recognize the range of brightness that the image former is able to provide.

18. The color revision method of claim 14, wherein the generating the gamma curve comprises:
converting RGB color values of the scanned compensation chart into a YCC color space; and
recognizing the range of brightness that the image former is able to provide to the image to be printed based on the YCC color space.

19. The color revision method of claim 18, wherein the converting the RGB color values into the YCC color space comprises
converting the RGB color values of the scanned compensation chart into a HSV color space,
converting only a hue value of the HSV color space into an RGB color space, and
converting RGB values of the converted RGB color space into the YCC color space.

20. The color revision method of claim 14, wherein the generating the gamma curve comprises generating a gamma curve corresponding to each of CMYK colors, and the changing the color conversion table includes using the gamma curve corresponding to each of the CMYK colors to change the color conversion table.

21. The color revision method of claim 14, further comprising receiving selection of a user favorite color brightness range for each of the CMYK colors,
wherein the changing the color conversion table comprises changing the color conversion table by reflecting the selected user favorite color brightness range.

22. The color revision method of claim 14, further comprising receiving input of a color revision initiation command from a mobile device.

23. The color revision method of claim 14, further comprising transmitting the changed color conversion table to a mobile device.

24. At least one non-transitory computer readable medium storing computer readable instructions which when executed control at least one processor to implement a method of claim 14.

* * * * *